US010455123B2

(12) United States Patent
Lesellier (10) Patent No.: US 10,455,123 B2
(45) Date of Patent: Oct. 22, 2019

(54) METHOD FOR INCREASING THE SATURATION OF AN IMAGE, AND CORRESPONDING DEVICE

(71) Applicant: STMicroelectronics SA, Montrouge (FR)

(72) Inventor: Estelle Lesellier, Meudon (FR)

(73) Assignee: STMicroelectronics SA, Montrouge (FR)

( * ) Notice: Subject to any disclaimer, the term of this patent is extended or adjusted under 35 U.S.C. 154(b) by 198 days.

(21) Appl. No.: 15/591,597

(22) Filed: May 10, 2017

(65) Prior Publication Data

US 2018/0139359 A1    May 17, 2018

(30) Foreign Application Priority Data

Nov. 17, 2016    (FR) ..................................... 16 61127

(51) Int. Cl.
| | | |
|---|---|---|
| *H04N 1/60* | (2006.01) | |
| *G06T 5/00* | (2006.01) | |
| *G06T 5/40* | (2006.01) | |
| *H04N 1/62* | (2006.01) | |

(52) U.S. Cl.
CPC ........... *H04N 1/6027* (2013.01); *G06T 5/009* (2013.01); *G06T 5/40* (2013.01); *H04N 1/6005* (2013.01); *H04N 1/6072* (2013.01); *H04N 1/628* (2013.01); *G06T 2207/10024* (2013.01)

(58) Field of Classification Search
CPC . G06T 5/40; G06T 5/009; G06T 2207/10024; H04N 1/6027; H04N 1/6005; H04N 1/628; H04N 1/6072

USPC .......................................................... 382/167
See application file for complete search history.

(56) References Cited

U.S. PATENT DOCUMENTS 8,570,341 B1 * 10/2013 Xie ...................... H04N 1/6005
345/589
2009/0022395 A1    1/2009 Cho et al.
2009/0304275 A1    12/2009 Kodavalla et al.
2014/0198256 A1    7/2014 Hsu

FOREIGN PATENT DOCUMENTS

| EP | 1326425 A2 | 7/2003 |
|---|---|---|
| EP | 2320378 A1 | 5/2011 |
| FR | 2980325 A1 | 3/2013 |

OTHER PUBLICATIONS

INPI Search Report and Written Opinion for FR 1661127 dated Jul. 10, 2017 (8 pages).

* cited by examiner

*Primary Examiner* — Daniel G Mariam
(74) *Attorney, Agent, or Firm* — Crowe & Dunlevy (57) ABSTRACT

An image formed from pixels each having components defining a color is processed to implement an increase in the saturation of the image depending on a gain applied by a transfer function depending on the components of the color of each pixel. The gain of the transfer function is parameterized using at least one control parameter respectively dedicated to at least one type of reference image content. The value of the at least one control parameter is calculated depending on the actual content of the image by implementing calculations including determining colorimetric statistics of the pixels of the image and processing the statistics in accordance with at least one processing model respectively associated with the at least one type of reference image content.

29 Claims, 6 Drawing Sheets

METHOD FOR INCREASING THE SATURATION OF AN IMAGE, AND CORRESPONDING DEVICE

PRIORITY CLAIM

This application claims the priority benefit of French Application for Patent No. 1661127, filed on Nov. 17, 2016, the disclosure of which is hereby incorporated by reference in its entirety.

TECHNICAL FIELD

Implementations and embodiments relate to the digital processing of images, for example photographic images, and in particular to a method for increasing the saturation of the colors of an image, and to the corresponding device.

BACKGROUND

A two-dimensional digital image, such as a photograph, is generally exploited in the form of a matrix composed of pixels. Each pixel forms an elementary unit of the image, transmitting a piece of color information, and the image is created by the spatial organization of various colors.

In red-green-blue (RGB) color spaces such as for example the standard red-green-blue (sRGB) space commonly employed in sensors and displays, the color of a pixel is determined by the proportion of each of the three primary colors red, green and blue forming the components of each pixel.

The sRGB color space is practical from a hardware point of view but very poorly representative of the human perception of a color. In contrast, the hue-saturation-brightness (HSB) color space (also called the hue-saturation-value or HSV color space) is for its part very close to the human perception of a color. Specifically, it is natural for a person to identify a hue (colors of the rainbow), a saturation (soft, pastel or strong character) and a brightness (dark or light character).

Other color spaces and methods for converting a digital image from one color space to another do exist and are well known.

It is commonplace, for example when altering photographs, to seek to increase the saturation of an image in order to embellish its appearance.

However, increasing the saturation of certain digital images, for example by applying an identical gain to the saturation of all the pixels of the image, may rapidly denature the content of the image. For example, the colors of the human skin turn unpleasant red-orangey hues, landscapes appear artificial, soft colors perceived as almost grey become bright and the saturation modulations of highly saturated areas of uniform hue disappear.

Solutions do exist that allow certain of these adverse effects to be avoided, for example by parameterizing the saturation gain depending on the input color of the pixel according to a transfer function that, for example, will generally allow the increase in the saturation of common skin hues to be limited, or by limiting the increase in the saturation of colors that are initially already very saturated.

However, the parameterization of such solutions remains the same whatever the image and may be unsuitable for certain image contents. Typically, the saturation of the skin hues of an image containing no faces or skin will also be limited. Furthermore, since skin hues are relatively numerous and varied, general methods are often not precise enough and therefore not very effective.

Currently, human intervention is therefore required if saturation is to be increased in a way that does not denature the content of an image.

Therefore, it is either very risky to embellish the appearance of an image by increasing its saturation if it is done in real time in a digital-image processing chain such as, for example, an image signal processor (ISP) integrated into a video camera, or, in contrast, any increase is made almost imperceptible by precaution.

For this reason, ways of implementing a method allowing the appearance of an image to be improved in terms of the perception of an increase in saturation are advantageously provided. The method is dynamically adaptable to each processed image and thus has a low risk of denaturing the image while nonetheless having a visible effect.

SUMMARY

According to one aspect, a method for increasing the saturation of the pixels of an image, each pixel having components defining a color, is provided, said increase depending on a gain applied by a transfer function depending on the components of each pixel.

According to one general feature of this aspect, the gain of the transfer function is parameterized by at least one control parameter respectively dedicated to at least one type of reference image content. For example, the types of reference image content may be faces and skin, white balance, areas of uniform hue or, more widely, landscapes.

The value of said at least one control parameter is calculated on the basis of the actual content of said image (i.e., what is shown in the processed image and/or at least one of the preceding images) by calculations including determining colorimetric statistics of the pixels of said image and processing said statistics. The statistical processing is carried out in accordance with at least one processing model respectively dedicated to the preservation of said at least one type of reference image content.

Thus, the control parameters have a value that is tailored to the actual content of each processed image, in order to preserve the respective types of reference image content. Said transfer function (which defines the dynamic of the increase in the saturation of the pixels of the image) thus parameterized by said control parameters is therefore made-to-measure for each of the processed images in order not to denature their content.

In other words, the transfer function used to increase the saturation is parameterized in a way that is dynamically adapted to each image. This makes it possible to optimize the perceived effect of the increase in the saturation and, in particular, to obtain an increase in the saturation that does not denature the content of the image without human intervention.

One processing model for example comprises implementing means for analyzing colorimetric statistics allowing the nature of the type of reference image content to which it is dedicated to be preserved.

Furthermore, one processing model may comprise a database, which is, for example, established beforehand by empirical statistical calibration, allowing the value of the respective control parameter to be determined.

For example, a first processing model allows the white balance of the nuances of white of an image content the color of which is not very saturated to be preserved; a second processing model allows the contrasts of an image content including a highly saturated area of uniform hue to be preserved; a third processing model makes it possible to avoid excessive saturation of an image content including a landscape; a fourth processing model allows natural skin hues of an image content including a face to be preserved.

According to one implementation, said at least one control parameter parameterizes at least one ceiling value of the gain of the transfer function depending on the hue and/or brightness and/or saturation of the color of each pixel.

Since the control parameters are respectively dedicated to one type of reference image content, it is envisageable that an image will not include all the available types of image content; thus, one implementation is provided in which the gain of the transfer function is parameterized by a plurality of control parameters, the values of said control parameters being calculated simultaneously, the control parameters parameterizing the gain of said transfer function being selected after said values of the control parameters have been calculated.

Said selection advantageously comprises selecting the control parameters that minimize the gain of said transfer function.

Specifically, a substantial limitation of the gain of the transfer function by one of the control parameters may be likened to the presence, in the content of the image, of the type of reference image content to which this control parameter relates.

According to one implementation, said determination of colorimetric statistics comprises converting the components of the pixels of the image to the hue-saturation-brightness colorimetric domain, selecting pixels having brightnesses located in a range excluding extreme brightnesses, classifying the selected pixels by hue segment and generating a histogram of the saturations of the selected pixels per hue segment.

Specifically, the HSV color space is an advantageous way to represent the color properties of an image such as perceived and described by an individual with standard vision.

For example, the range excluding the extreme brightnesses may be from 1% to 99% of the maximum possible value of a brightness component in order to remove values that in practice are biased by acquisition noise or that correspond to high brightnesses (such as light sources or specular reflections).

The hue segments advantageously correspond to a pre-calibrated segmentation equally distributed between six main hues (red, yellow, green, cyan, blue, magenta) or indeed a segmentation that is nonuniform and representative of the hues of image contents that are usual in photography.

For example, in this second case, the general hues of the skin (reddish with magenta and yellow tones) are grouped in one and the same segment. Likewise, the yellow-green hues of vegetation are grouped in one and the same segment and the blue hues of the sky are grouped in one and the same segment.

Said processing of the colorimetric statistics may be carried out in accordance with a first processing model comprising detecting the non-blue hue segment having the highest population of low-saturation pixels, said hue segment forming a first control parameter parameterizing at a value comprised between 0.9 and 1.1 the gain of said transfer function for the pixels corresponding to said segment, in order to preserve white balance.

The median value of the saturations of each hue segment may be used (for example, by thresholding) to determine the least saturated of the hue segments and, if it is sufficiently unsaturated to probably contain the whites of the image (for example, below a threshold), to activate or not said parameterization.

The saturation of pixels categorized by this what could be called greyish tint, which is very prevalent in the scene and not very saturated, is not increased, thereby allowing the greyish nature of this type of image content, which is particularly sensitive in the case of night scenes or scenes that are not very saturated (for example snow scenes, scenes of interiors, etc.), to be preserved while nonetheless increasing the saturation of any other types of content in the given image.

Night and not very saturated scenes may additionally be detected by interdependently thresholding the median value of the saturation and brightness of each hue segment, and optionally used to activate said processing.

The reason for the exclusion of the blue hue segment(s) is that advantageous observations have shown that, since the color temperature of light sources in night or interior scenes is less blue than daylight, the whites and greyish colors of a photograph of such scenes will be statistically more likely to occupy hotter hue segments (i.e. yellow-red-magenta segments). Thus, this exclusion makes it possible not to inappropriately block an increase in the saturation of colors of blue hues, such an increase being subjectively widely appreciated when applied to contents depicting the sky or the sea and conventionally being expected when this type of processing for perceptually improving color is implemented.

Furthermore, too great an increase in the saturation of the colors in an area of uniform hue may cause the maximum saturation of the colors of the pixels in said area to be reached or, in other words, the spatial profile of the saturation of an area of uniform hue to be clipped. This may cause contrasts initially present in said area to be lost.

It has advantageously been observed that a maximum acceptable degree of clipping of the saturation per hue segment is dependent on the width of the distribution of the respective saturation per hue.

Thus, said processing of the colorimetric statistics may be carried out in accordance with a second processing model comprising, on the basis of pre-established acceptable degrees of clipping of the saturation per hue segment and on the basis of the width of the distribution of the saturation per hue, calculating one gain value per hue segment ensuring said degrees of acceptable clipping are respected, said gain values forming second control parameters parameterizing the gain of said transfer function so that it is below said gain values per hue segment ensuring said degrees of acceptable clipping are respected, in order to preserve the contrasts of areas of uniform hue.

Moreover, said processing of the colorimetric statistics may be carried out in accordance with a third processing model comprising a calculation of the average saturation of the pixels per hue segment that, by way of a pre-established table of values, determines a ceiling value of the gain per hue segment, forming third control parameters parameterizing the gain of said transfer function so that it is below said ceiling values, in order to prevent excessive saturation and to ensure the colors preserve a natural effect.

The pre-established table of values may depend on various types of scenes (beach, countryside, snow, etc.) that, for example, are selected manually by the user of the system or detected automatically by scene detection. By default, without scene selection or detection, it is possible to define a default table of values corresponding to beach scenes in order to preserve by default sand and stone (yellow, orange) hues that, just like skin hues, are very sensitive to excessive saturations.

The processing model advantageously contains a database including a table of the maximum acceptable values of the saturation gain as a function of the average value of the saturation per hue segment.

According to one implementation, said determination of colorimetric statistics comprises detecting faces in the image and where appropriate extracting a region of interest of the image corresponding to at least one face, converting components of the pixels in the region of interest to the hue-saturation-brightness colorimetric domain, generating a histogram of the hues, a histogram of the brightnesses and a histogram of the saturations of the pixels in the region of interest.

In this implementation, said processing of the colorimetric statistics is carried out in accordance with a fourth processing model comprising establishing a range of hues of the skin colors in the image by selecting classes of the histogram of hues that are centered on a median and have a frequency of occurrence higher than a threshold level, establishing an upper limit of a range of brightnesses of the skin colors in the image by selecting the median of the histogram of brightnesses and establishing a ceiling value of the gain, said range of hues, range of brightnesses and ceiling value forming fourth control parameters parameterizing the gain of the transfer function so that it is below said ceiling value for the colors comprised in said ranges of hues and/or brightnesses, in order to preserve natural skin colors.

This implementation allows the saturation of skin hues not to be limited in an image the content of which includes no faces, and, where appropriate, the skin hue for which the saturation is ceilinged to be precisely that of the skin colors present in the image, and, in particular, accessory hues possibly present in the regions of interest (such as spectacles, a hat, etc.) or false detections to be excluded, thus ensuring a greater margin of improvement in the saturation for other image contents of hue similar to the skin's.

Said establishment of a ceiling value of the gain includes selecting the median of the histogram of those saturations of the pixels in the region of interest which are included in a pre-established interval.

The pre-established interval advantageously corresponds to a hue interval including the usual hues of skin colors, allowing false face detection to be thwarted.

The generation of the histogram of the hues of the pixels in the region of interest may include smoothing the number of occurrences of hues using a moving window, for example of 3 or 5 hue span, that advantageously preserves a high enough resolution to define the limits of the hue interval.

This makes it possible to decrease locally in the histogram an effect of quantification of low hue values (close to 0, and therefore in the red in conventional HSB transformations) often introduced by the presence of noise in the darkest RGB pixels of the image and to increase the reliability of the extraction of skin hues in the case of dark colors of red hue.

When the brightness of a color is low (for example, in the case of a shaded face or a face photographed contre-jour) it may be optimal to use the brightness range of said colors to select the skin colors the saturation of which is to be ceilinged instead of or in addition to selecting by hue. This advantageously leads to a larger margin of improvement in the saturation for the other contents of the photo of hue close to that of the skin.

Thus, according to one implementation, the fourth control parameters parameterize the gain of said transfer function so that it is below said ceiling value for colors comprised in said ranges of hues in the case where the brightness of the region of interest is above a threshold, and for colors comprised in said ranges of brightnesses in the case where the brightness of the region of interest is below said threshold.

According to another aspect, a device is provided for processing an image formed from pixels each having components defining a color, comprising a processing means that is configured to implement an increase in the saturation of the pixels of the image depending on a gain applied by a transfer function depending on the components of each pixel, a parameterizing means configured to parameterize the gain of said transfer function with at least one control parameter respectively dedicated to at least one type of reference image content and a calculating means configured to calculate the value of said at least one control parameter on the basis of the actual content of said image by implementing calculations including determining colorimetric statistics of the pixels of said image and processing said statistics in accordance with at least one processing model respectively associated with at least one type of reference image content.

According to one embodiment, the parameterizing means is configured to parameterize at least one ceiling of the gain of the transfer function depending on the hue and/or brightness and/or saturation of the color of each pixel.

According to one embodiment, the calculating means is configured to simultaneously calculate the values of a plurality of control parameters, and the parameterizing means is configured to select the control parameters parameterizing the gain of said transfer function after said control parameters have been calculated.

Advantageously, the parameterizing means is configured so that said selection comprises selecting control parameters that minimize the gain of said transfer function.

According to one embodiment, the calculating means is configured to implement a determination of colorimetric statistics that comprises a conversion of the components of the pixels of the image to the hue-saturation-brightness colorimetric domain, a selection of the pixels having brightnesses located in a range excluding extreme brightnesses, a classification of the selected pixels by hue segment and a generation of a histogram of the saturations of the selected pixels per hue segment.

The calculating means is advantageously configured so that said hue segments correspond to a pre-calibrated segmentation equally distributed between six main hues (red, yellow, green, cyan, blue, magenta) or indeed a segmentation that is nonuniform and representative of image contents that are usual in photography.

The calculating means may be configured to implement said processing of the colorimetric statistics in accordance with a first processing model comprising detecting the non-blue hue segment having the highest population of low-saturation pixels, said hue segment forming a first control parameter, the parameterizing means being configured, on the basis of the first control parameter, to parameterize at a value comprised between 0.9 and 1.1 the gain of said transfer function for the pixels corresponding to said segment, in order to preserve white balance.

The calculating means may be configured to implement said processing of the colorimetric statistics in accordance with a second processing model furthermore comprising calculating, on the basis of pre-established acceptable degrees of clipping of the saturation per hue segment and on the basis of the width of the distribution of the saturation per hue, a gain value per hue segment ensuring said degrees of acceptable clipping are respected, said gain values forming second control parameters, the parameterizing means being configured, on the basis of the second control parameters, to parameterize the gain of said transfer function so that it is below said gain values per hue segment ensuring said degrees of acceptable clipping are respected, in order to preserve the contrasts of the areas of uniform hue.

The calculating means may be configured to implement said processing of the colorimetric statistics in accordance with a third processing model comprising calculating the average saturation of the pixels per hue segment and, by way of a table of data, determining ceiling values of the gain of the transfer function per hue segment forming third control parameters, the parameterizing means being configured, on the basis of the third control parameters, to parameterize the gain of said transfer function so that it is below said ceiling values, in order to prevent excessive saturation.

According to one embodiment, the calculating means is configured to implement a determination of colorimetric statistics that comprises detecting faces in the image and where appropriate extracting a region of interest of the image corresponding to at least one face, converting the components of the pixels in the region of interest to the hue-saturation-brightness colorimetric domain, generating a histogram of the hues, a histogram of the brightnesses and a histogram of the saturations of the pixels in the region of interest, and to implement said processing of colorimetric statistics in accordance with a fourth processing model comprising establishing a range of hues of the skin colors in the image by selecting classes of the histogram of hues that are centered on a median and above a threshold population, establishing an upper limit of a range of brightnesses of the skin colors in the image by selecting the median of the histogram of brightnesses and establishing a ceiling value of the gain of said transfer function, said range of hues, range of brightnesses and ceiling value forming fourth control parameters, the parameterizing means being configured, on the basis of the fourth control parameters, to parameterize the gain of the transfer function so that it is below said ceiling value for the colors comprised in said ranges of hues and/or brightnesses, in order to preserve natural skin colors.

The calculating means is advantageously configured so that said establishment of a ceiling value of the gain of said transfer function includes selecting the median of the histogram of those saturations of the pixels in the region of interest which are included in a pre-established interval.

The calculating means may be configured so that the generation of the histogram of the hues of the pixels in the region of interest includes data smoothing.

Advantageously, the parameterizing means is configured, on the basis of the fourth control parameters, to parameterize the gain of said transfer function so that it is below said ceiling value for colors comprised in said range of hues in the case where the average brightness of the region of interest is above a threshold, and to parameterize the gain of said transfer function so that it is below said ceiling value for colors comprised in said range of brightnesses in the case where the average brightness of the region of interest is below said threshold.

According to one embodiment, the calculating means, the parameterizing means and the processing means are configured to be implemented automatically.

Furthermore, an electronic apparatus such as a personal computer, a tablet or a mobile telephone including an image-processing device such as defined above is provided.

BRIEF DESCRIPTION OF THE DRAWINGS

Other advantages and features of the invention will become apparent on examining the detailed description of completely nonlimiting embodiments and implementations, and the appended drawings, in which.

DETAILED DESCRIPTION

Figure 1:
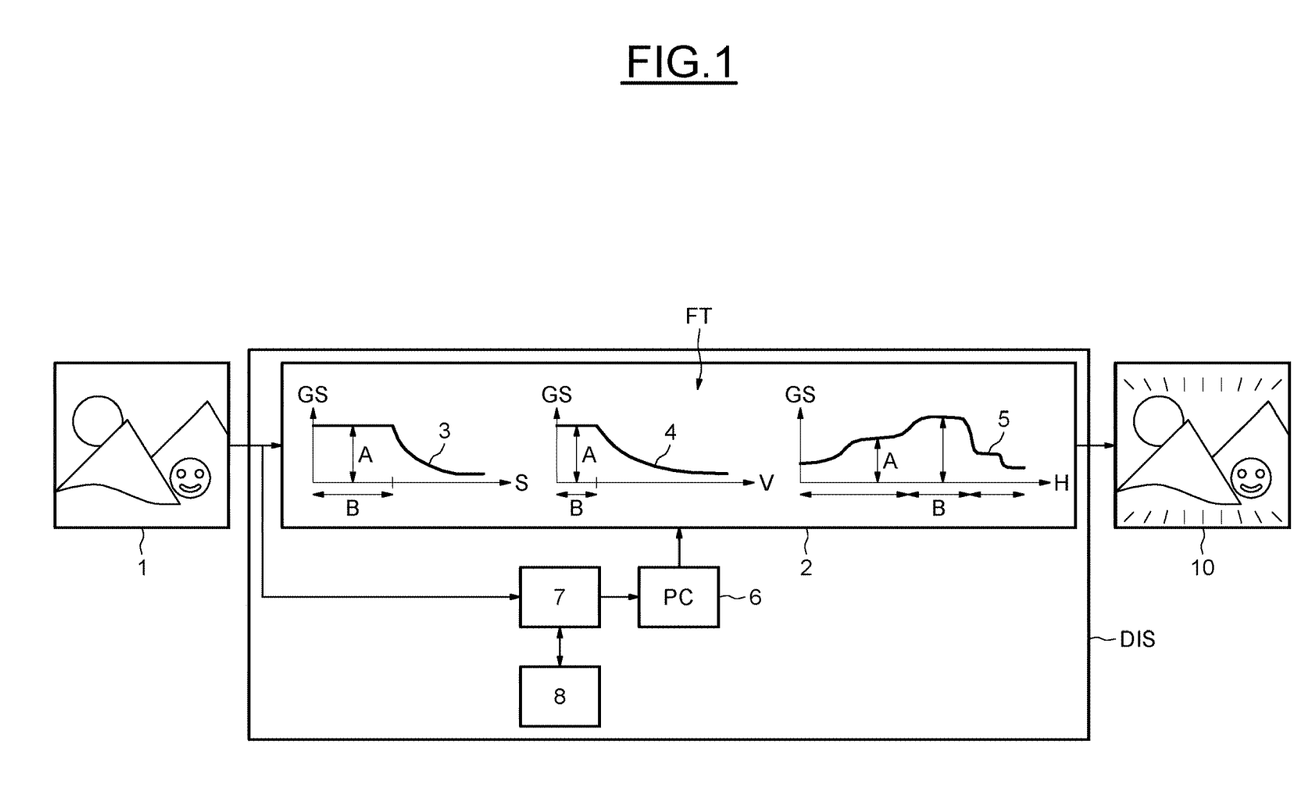
FIGS. 1 and 2 show an exemplary device for increasing the saturation of an image and an exemplary electronic apparatus including such a device.

FIG. 1 shows one embodiment of an image-processing device DIS.

An image 1, for example generated by a photographic sensor, includes pixels each having components defining its color, for example the red, green and blue components of an RGB color space.

The content of the image 1 may for example include a face and a natural landscape.

The device DIS includes a processing circuit 2 configured to increase the saturation of the image 1 so as to obtain the image 10.

The processing circuit 2 is for example configured to carry out said increase in the saturation of the image in the RGB color space depending on the equivalent hue, saturation and brightness components of the colors in the HSV (aka HSB) color space, by means of a conventional mathematical conversion that is known per se.

The increase in the saturation of the color of each pixel is directed by at least one transfer function FT depending on the hue H, saturation S and value or brightness V of the color of each pixel.

For example, as shown by the curves 3 and 4, the gain Gs of the transfer function FT decreases for colors that already have a high saturation or a high brightness. The curve 5 shows that the gain Gs of the transfer function FT is tailored to various hue segments.

The device DIS includes a parameterizing circuit 6 configured to parameterize certain characteristics of the transfer function FT, which characteristics are indiscriminately designated by the letters A and B in the examples shown by the curves 3, 4 and 5.

Thus, the parameterizing circuit 6 controls the processing circuit 2 so that the increase in the saturation is implemented optimally for and dedicated to each image content present in the processed image 1.

In other words, the parameterizing circuit 6 parameterizes the gain Gs of the transfer function according to which the saturation of an image is increased depending on the components of each of its pixels.

A calculating circuit 7 allows colorimetric statistics of the pixels of the image 1 to be determined and said statistics to be processed in accordance with one or more processing models 8.

The processing model 8, for example, comprises an implementation for analyzing colorimetric statistics allowing the nature of the type of reference image content to which it is dedicated to be preserved.

The processing model 8, for example, includes a database including saturation preferences as a function of pixel components and as a function of types of image content that are common in photography.

The database is, for example, obtained by empirical statistical calibration of types of reference image content and achieved using very diverse respective image populations.

The results of the processing of the colorimetric statistics of the image 1 include control parameters PC allowing the parameterizing circuit 6 to parameterize said transfer function FT.

Each control parameter is dedicated to and protects one type of reference image content, for example with the aim of preserving white balance, of preserving the contrasts of areas of almost uniform hues, of preventing an excessive saturation or even of preserving natural skin colors.

Figure 2:
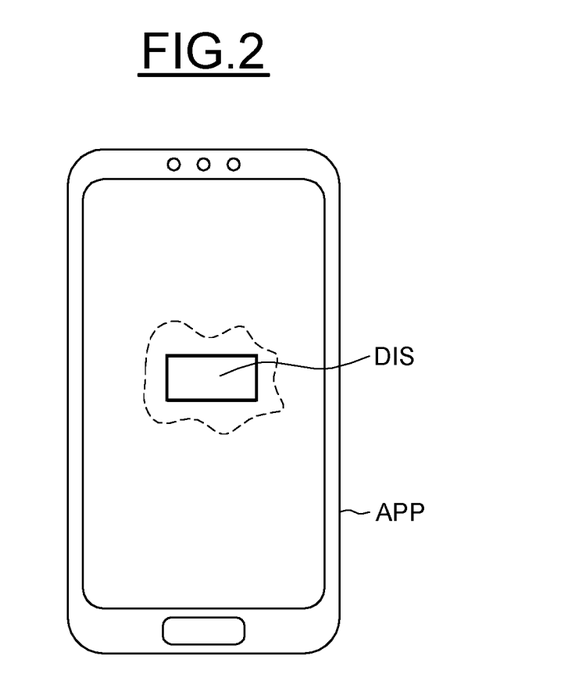

FIG. 2 shows an electronic apparatus APP, such as a personal computer, a tablet or a mobile telephone, including a device DIS. The apparatus APP may furthermore comprise a camera, a display, and a chain of image-processing means including the device DIS. During use of the apparatus APP, the device DIS may be implemented automatically and/or controlled by an operator.

The device DIS is especially configured to put into operation the implementations described below with reference to FIGS. 3 to 11.

FIGS. 3 to 11 illustrate implementations of a method allowing the gain of the one or more transfer functions defining the dynamic of the increase in the saturation of an image to be parameterized, relatively to the actual content of the processed image. Control parameters PC respectively dedicated to one type of reference image content allow said parameterization to be carried out.

The method comprises determining colorimetric statistics ST of the pixels of the image. The various control parameters are generated by processing, or analyzing AN, the colorimetric statistics ST.

Each processing operation AN is carried out in accordance with at least one processing model respectively associated with said at least one type of reference image content.

A processing model especially comprises colorimetric-statistical analysis method steps allowing said associated type of reference image content to be preserved.

Thus, each control parameter has a value tailored to the content of each image.

Furthermore, a processing model may comprise a database, which is, for example, established beforehand by empirical statistical calibration, in order to determine the value of the respective control parameter.

More particularly, FIGS. 3 to 11 illustrate methods for obtaining a first control parameter allowing white balance to be preserved, second control parameters allowing the contrasts of areas of almost uniform hue to be preserved, third control parameters allowing a subjectively excessive saturation to be prevented and fourth control parameters allowing natural skin colors to be preserved, as well as examples of the analytical resources employed for these purposes.

Figure 3:
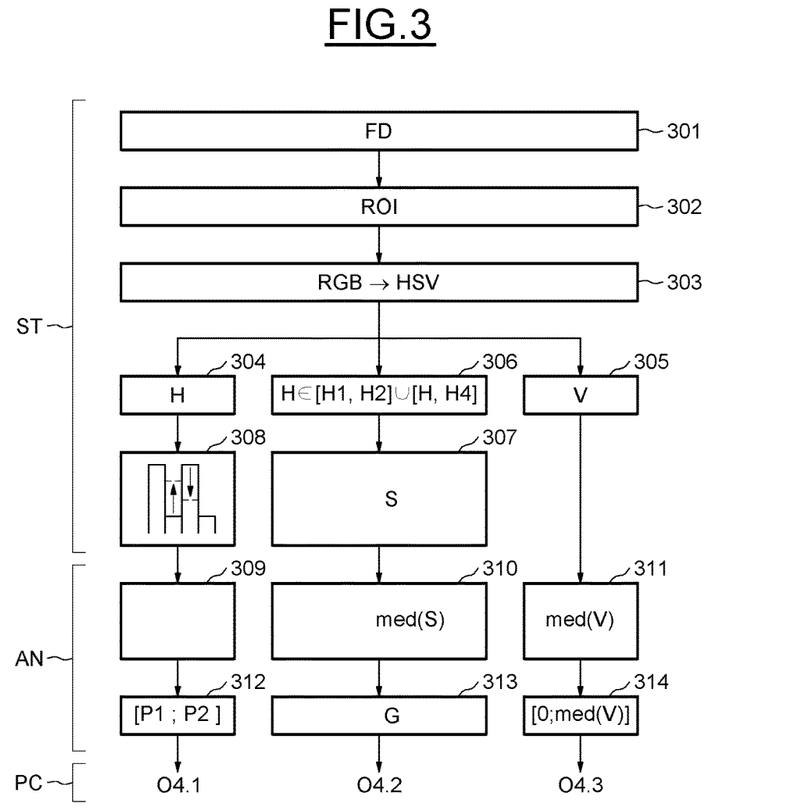
FIGS. 3 to 11 show various implementations of a method for increasing the saturation of an image.

FIG. 3 shows one implementation of a method for increasing the saturation of an image, and more particularly the obtainment of fourth control parameters O4.1, O4.2 and O4.3 in accordance with a fourth processing model allowing natural skin colors to be preserved.

This implementation firstly includes detecting faces 301 potentially present in the content of the image.

Reliable methods for face detection (FD) that are known per se exist and details thereof will not be given here.

It is statistically relevant to evaluate the color of any visible skin portion on the basis of the color of the skin of a face, even in the case of differences in illumination or natural variations in the color of the skin, such as those due to tanning.

Specifically a face and especially the lips often contain the most saturated skin colors of the body and furthermore faces are generally the preferred contents of photographs, meaning that they are highly likely to be present when the image contains a skin content.

The regions of interest including the faces of the image are extracted, then concatenated into a single region of interest ROI in an extracting step 302.

This will subsequently allow colorimetric statistical calculations to be carried out in a single region and thus the number of calculational operations to be carried out when a plurality of faces are present in the content of the image to be limited.

Nevertheless, it is possible to carry out said statistical calculations on each extracted region of interest respectively including a face, ensuring a better precision at the cost of additional calculational operations.

In this example, a conversion 303 of the components of the pixels of the image from the RGB colorimetric domain to the HSV colorimetric domain is carried out. Below, the term "colorimetric domain" will be designated by the more precise conventional term "format".

The RGB/HSV format conversion may be carried out before the detection of faces, depending on the detecting method FD used, and it is also possible for the format of the initial image to be different from the RGB format or for it to already be in the HSV format.

On the basis of the concatenated region of interest and in the HSV format the following are generated: a histogram 304 representing the distribution of the hues H of the pixels in the region of interest and a histogram 305 representing the distribution of the brightnesses V of the pixels in the region of interest.

A histogram 307 representing the distribution of the saturations S of the pixels is also generated, but for a population of pixels having hues H comprised in a pixel selection 306 corresponding to possible skin colors (substantially between magenta-reddish and yellow-orangey), i.e. pixels of hues comprised in one of two pre-established intervals [H1, H2] or [H3, H4].

For example, H1=0 and H2=0.083 for reds containing yellow tones and H3=0.91 and H4=1 for reds containing magenta tones.

Limiting the population of pixels to a hue interval [H1, H2]∪[H3, H4] makes it possible to not take into account any regions of the image not containing skin (i.e., any regions detected by error).

The limits H1, H2, H3, H4 are, for example, included in a database of the fourth processing model, and are, for example, a result of empirical statistical calibration.

The histogram of hues is advantageously smoothed 308, this allowing the detection of skin-color hues to be reinforced in a coordinate system attributing thereto an indexation close to 0 (see, the description given with reference to FIG. 4 herein) their distributions having a tendency to be spread around low hue values in the case of low brightnesses.

The distribution of the hues is then analyzed 309, this analysis allowing at least one control parameter O4.1 including the range of hues 312 of the skin colors present in the processed image to be generated.

Figure 4:
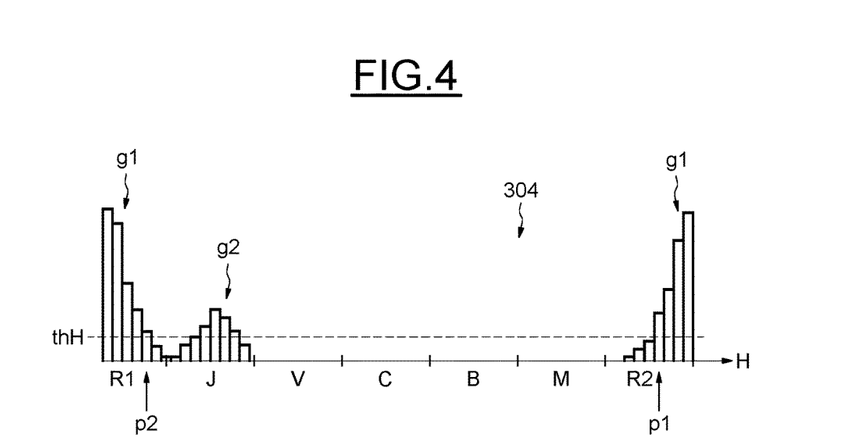

FIG. 4 shows an exemplary histogram 304 of the distribution of the hues in a region of interest including a face.

The hues, represented by an arbitrary indexation of the x-axis of the histogram, are designated in the example in FIG. 4 by segments of large families of colors: a first red R1, yellow Y, green G, cyan C, blue B, magenta M and a second red R2.

In this representation the indexation is discontinuous for red hues, but since the spectrum of hues is continuous, the highest indexation of the second red-hue segment R2 will theoretically join up with the lowest indexation value of the first red-hue segment R1.

Thus, this distribution includes a first reconstructed Gaussian profile g1, which is located in the red-hue segments R1, R2, and a second Gaussian profile g2 located in the yellow-hue segment Y.

The range of hues of the skin colors present in the actual content of the processed image is selected by detecting, starting from the median class of the numerically greatest Gaussian profile or the profile that is centermost in the range of the reds (for example the one closest to 0 in a conventional HSV space) (here the profile g1), the last classes of the histogram 304 that have populations higher than a threshold population thH.

In other words, a range of hues of the skin colors in the image is established by selecting the classes of the histogram of hues that are both consecutively centered on a median and higher than a threshold population.

This statistical method allows, very precisely, the limits P1, P2 of the skin hues present in the region of interest to be selected without selecting other hues for which a greater increase in the saturation would be desirable.

Specifically, in the example in FIG. 4, the second Gaussian profile g2, for example, originates from a gold-coated spectacle frame present in the region of interest but not representative of a skin hue.

The control parameter O4.1 includes the interval [P1, P2] representing the range of hues 312 of the skin colors present in the image.

The median value of the saturations med(S) of pixels having a hue comprised in the pre-established interval [H1, H2] is calculated (310) on the basis of the data of the histogram of saturations 307.

The control parameter O4.2 includes a ceiling value 313 of the gain of the transfer function, which value is obtained on the basis of said median value of the saturation med(S).

Furthermore, the median value of the data of the histogram of brightnesses med(V) of the pixels in the region of interest is calculated (311) in order to detect dark faces (for example, if below a threshold) and the sum of the median value plus a delta (for example, 1 or 2 times the standard deviation of the Gaussian) forms the upper limit of a brightness interval 314 the lower limit of which is set to 0.

The control parameter O4.3 includes this brightness interval 314.

The two control parameters O4.1, O4.2 allow the gain of the transfer function defining the dynamic of the increase in the saturation to be parameterized depending on the hue of the pixels of the image so that it is below said ceiling value 313 for all the pixels having a hue comprised in the hue interval 312.

Alternatively, the two control parameters O4.2 and O4.3 allow the gain of the transfer function defining the dynamic of the increase in the saturation to be parameterized depending on the brightness of the pixels of the image so that it is below said ceiling value 313 for all the pixels having a brightness comprised in the brightness interval 314.

In both cases, the processing model corresponding to the calculation of the control parameters O4.1, O4.2, O4.3 may also comprise a preferential saturation model Sp that is, for example, obtained on the basis of empirical statistical calibrations and that, for example, depends on the average values of the brightness and hue of the skin in the regions, this model allowing a preferential gain (G=Sp/med(S)) and a preferential minimum and maximum gain interval to be calculated, these quantities themselves being functions of med(S), med(V) and [P1; P2].

The second alternative allows the transfer function to be precisely parameterized in the presence of dark facial colors.

Figure 5:
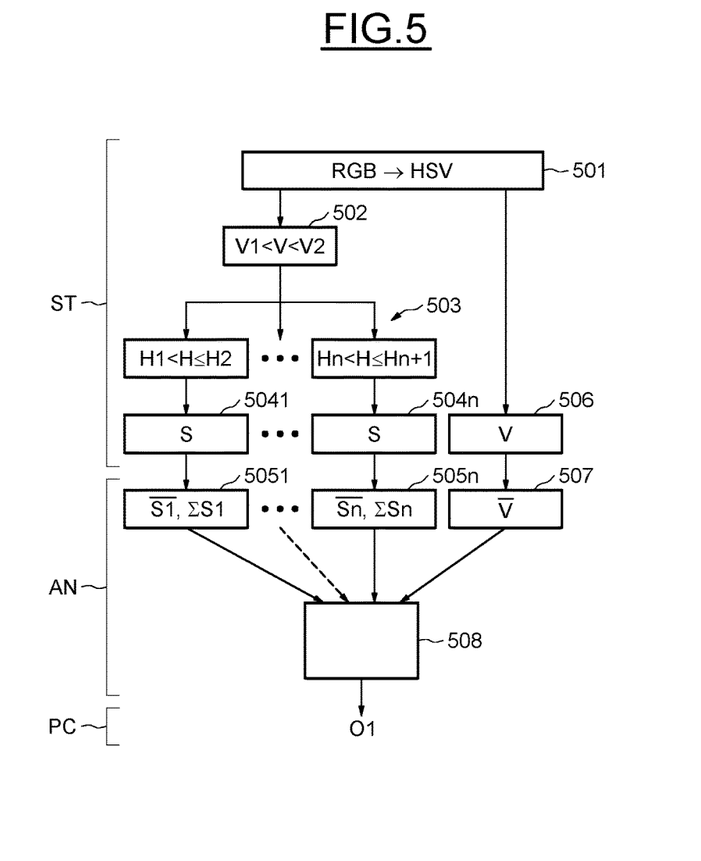

FIG. 5 shows one implementation of a method for increasing the saturation of an image, and more particularly the obtainment of the first control parameter O1 in accordance with a first processing model allowing white balance to be preserved.

This implementation includes a conversion 501 of the image to HSV format.

Selecting 502 pixels having a brightness comprised between two limits V1 and V2 allows pixels having very low or very high brightnesses to be excluded and the statistical calculations to be carried out on a population of pixels of average brightnesses.

The brightness limits V1 and V2 are for example set on the basis of empirical statistical calibrations and are included in the first processing model.

For example, the limit V1 may be equal to 1% of the maximum value of a brightness component and the limit V2 may be equal to 99% of the maximum value of a brightness component.

The pixels thus selected on the basis of their brightnesses are then classified 503 by hue segment. The classification may include a number n of hue segments of equal sizes, or n hue segments defined according to a pre-calibrated segmentation representative of image contents that are usual in photography, such as for example the general hues of the skin, the general hues of plant colors or the blue hues of the sky.

A histogram 5041-504n of the saturations for each hue segment is generated and the average $\overline{S}1$-$\overline{S}n$ saturation per hue segment and the sum of the saturations per hue segment $\Sigma S1$-$\Sigma Sn$ are calculated (5051-505n).

Furthermore, the histogram of the brightnesses of the pixels of the whole image is generated (506), and the average value $\overline{V}$ of the brightnesses is calculated (507).

If the image meets low-brightness or low-saturation conditions (determined from the cumulative total of the sums of the saturations per hue segment 5051-505n) then the non-blue hue segment 508 having the highest population of low-saturation pixels is detected in the data of the histograms 5041-504n of the saturations per hue segment.

The low-saturation and low-brightness conditions are, for example, defined by statistics obtained from a bank of images of all sorts.

The threshold average brightness may, for example, be equal to 20% of the maximum value of a brightness component.

The threshold average saturation may be comprised between 42% and 65% of the maximum value of a saturation component, this threshold average saturation decreasing proportionally to the average brightness of the image.

The reason for the exclusion of the blue hue segment(s) is that advantageous observations have shown that in night or interior scenes whites and greyish colors in photographs are statistically more likely to occupy hotter hue segments (i.e. yellow-red-magenta segments) because the color temperature of light sources in such scenes is less blue than daylight.

Thus, this exclusion makes it possible to not inappropriately block an increase in the saturation of colors of blue hues, such an increase being subjectively widely appreciated when applied to contents depicting the sky or the sea and conventionally being expected when this type of processing for perceptually improving color is implemented.

The control parameter O1 includes, where appropriate, said hue segment 508 having the highest population of low-saturation pixels, and allows the transfer function defining the dynamic of the increase in the saturation to be parameterized depending on the hue of the pixels of the image, so that the saturation of any pixel having a hue comprised in this hue segment 508 is not increased.

Figure 6:
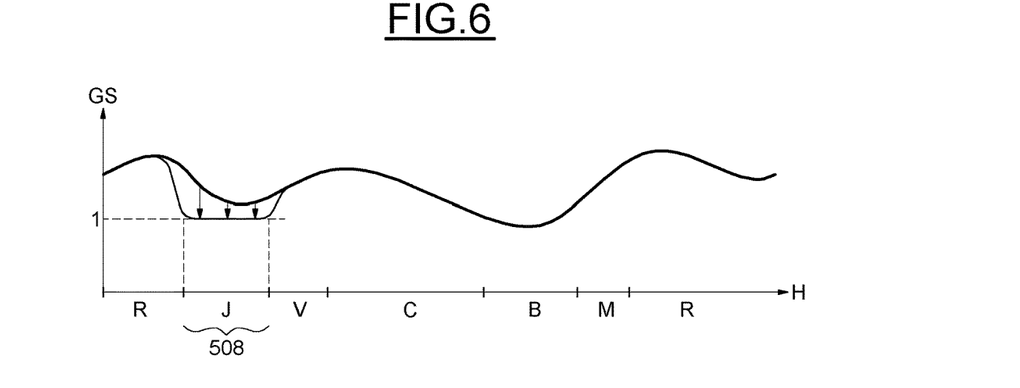

FIG. 6 shows an exemplary transfer function parameterized so that the saturation of any pixel having a hue comprised in the segment 508, here the segment of yellow hues Y, is not increased (gain Gs set to 1 in this segment 508).

Figure 7:
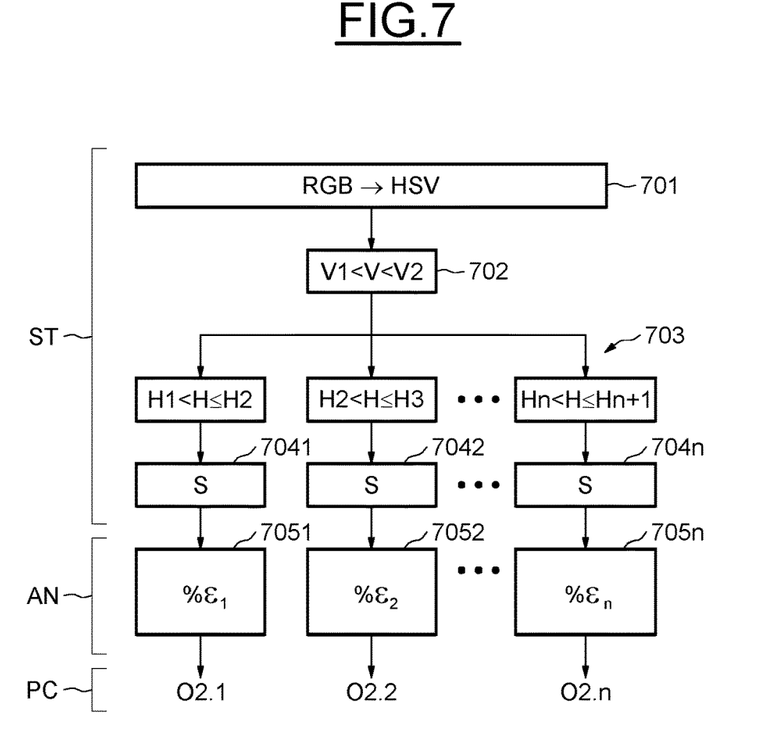

FIG. 7 shows one implementation of a method for increasing the saturation of an image, and more particularly the obtainment of the second control parameters O2.1, O2.2-O2.n, in accordance with a second processing model allowing the contrasts of areas of uniform hues to be preserved.

This implementation includes, similarly to the implementation described with reference to FIG. 5, converting 701 the image to HSV format, then selecting 702 pixels having a brightness comprised between two limits V1 and V2, then classifying the pixels by hue segment 703 and generating histograms of the saturation of the pixels per hue segment 7041, 7042-704n.

The number of hue segments may vary and is designated by the letter n.

For each hue segment, a maximum degree of clipping % $\varepsilon_k$ is calculated, where $1 \leq k \leq n$.

Figure 8:
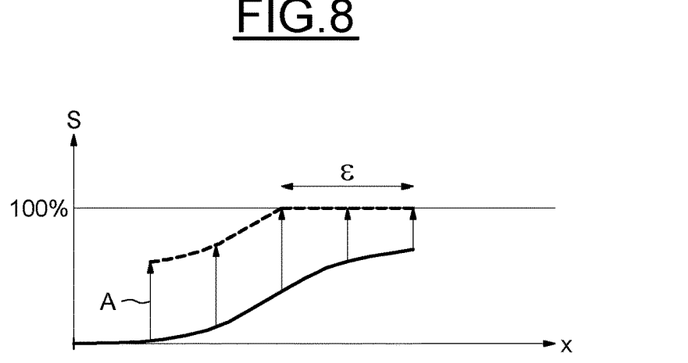

FIG. 8 shows clipping ε of the spatial variation (in a direction x) of the saturation of the pixels in a region of an image after the saturation of this image has been increased by a gain A.

Specifically, an image zone the pixels of which are initially close to the maximum value of the saturation component runs the risk of losing its dynamic, or the profile of its variation, if its saturation is increased.

The pixels the initial saturation of which is relatively close to the maximum saturation value will all reach the maximum value (100%) and clipping c will thus occur.

If the clipping ε is too great, nuances in contrast are lost in such image regions.

It has been studied and discovered that a maximum degree of acceptable clipping depends on the width of the distribution of the saturations of the pixels of a given hue.

For each hue segment, an acceptable degree of clipping for the most saturated pixels of the segment is established beforehand via subjective tests on a base of images, said degree being expressed as a limiting percentage of the total number of pixels in the segment.

For each saturation histogram or sum saturation histogram it is determined which saturation value (denoted clipHsat) corresponds to this degree of clipping.

The maximum gain to be applied in order not to exceed the acceptable clipping, denoted gainLimClip is: gainLimClip=1/clipHsat (in the case of a normalized saturation space, i.e. the maximum saturation value is normalized to 1).

Next, the value of said maximum gain gainLimClip is relaxed if the distribution is wide, indicating a hue present in the image with a wide diversity of saturations and therefore having a strong visual impact, in order to prevent clipping-induced compression thereof.

In this respect, in each saturation histogram per hue 7041, 7042-704n, a class clipLsat corresponding to a minimum amount of pixels that is statistically representative of a minimum dynamic is also determined.

The width of the distribution of the saturations is represented by α, where α=(clipHsat−clipLsat)/(clipHsat−0).

If α is close to 1, the distribution is wide.

A weighted sum is calculated to determine the relaxed gain, denoted A, to be applied:

$$A=\alpha*gainLimClip+(1-alpha)*gainMax,$$

where gainMax is the maximum gain supported by the application (for example gainMax=2.5).

In other words, on the basis of the pre-established acceptable degrees of clipping of the saturation per hue segment a gain value A1-An ensuring said degrees of acceptable clipping are respected is calculated (7051-705n) for every hue segment depending on the width of the distribution of the saturation per hue 7041, 7042-704n.

The control parameters O2.1, O2.2-O2.n respectively include the gain values A1-An per hue segment and allow the transfer function defining the dynamic of the increase in the saturation to be parameterized depending on the hue of the pixels of the image, so that the increase in the saturation does not introduce clipping greater than said degree per hue segment.

Figure 9:
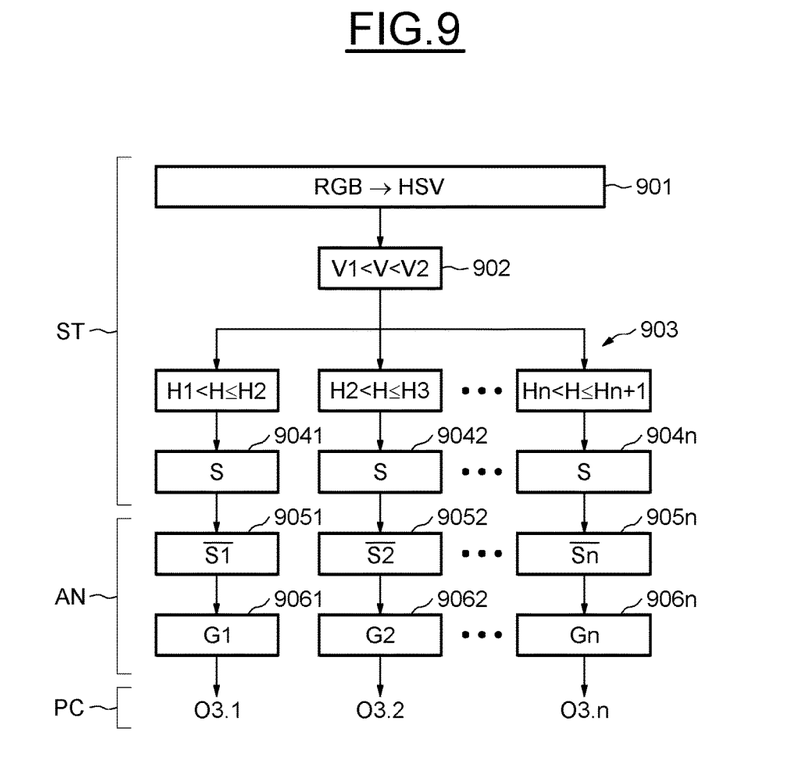

FIG. 9 shows one implementation of a method for increasing the saturation of an image, and more particularly for obtaining third control parameters O3.1, O3.2-O3.n in accordance with a third processing model allowing excessive saturation to be prevented.

This implementation includes, similarly to the implementations described with reference to FIGS. 5 and 7, converting 901 the image to HSV format, then selecting 902 pixels having a brightness comprised between two limits V1 and V2, then classifying pixels by hue segment 903, and generating histograms of the saturation of the pixels per hue segment 9041, 9042-904n.

The average saturation values per hue segment $\overline{S1}$, $\overline{S2}$, $\overline{Sn}$ are calculated (9051, 9052-905n).

A table, for example obtained by empirical statistical calibration and included in the third processing model, allows ceilings G1, G2-Gn to be determined (9061, 9062-906n) for the gain of the transfer function FT directing the increase in the saturation per hue segment, on the basis of the average saturation values per hue segment $\overline{S1}$, $\overline{S2}$-$\overline{Sn}$.

Figure 10:
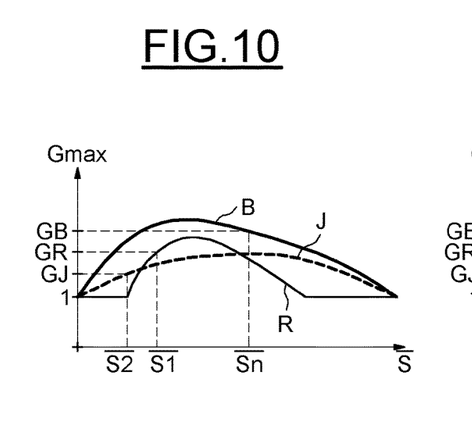

This table, a graphical example of which is shown in FIG. 10, is obtained by statistical experimentation, for example by asking a human jury to independently vote on the maximum acceptable saturation gain that can be applied before the images of a bank of test images begin to appear denatured because of excess saturation.

An example of results of such a vote may be seen in FIG. 10, these results including the maximum acceptable gain Gmax for red hues R, yellow hues Y and blue hues B as a function of the initial average saturation $\overline{S}$.

The average saturation values $\overline{S1}$, $\overline{S2}$-$\overline{Sn}$ obtained beforehand are then injected into said tables, providing respective maximum acceptable gains G1, G2-Gn.

In this example, as the average saturations $\overline{S1}$, $\overline{S2}$-Sn are respectively considered to correspond to the hue segments R, Y and B, the maximum acceptable gains are respectively designated GR, GY and GB.

Figure 11:
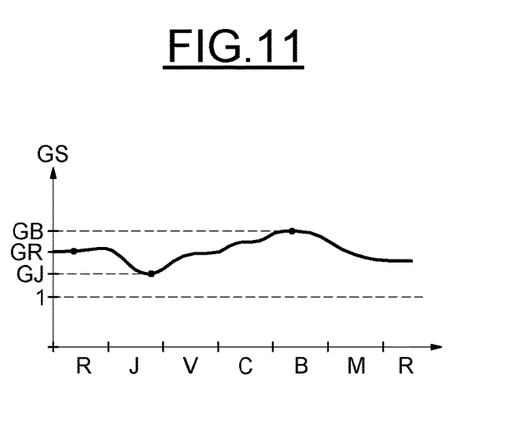

An example of the transfer function parameterized by the control parameters O3.1, O3.2-O3.n is shown in FIG. 11 in which the values of the maximum acceptable gains GR, GY, GB are shown for the respective hue segments R, Y and B.

Advantageously, the control parameters O4.1-O4.3, O1, O2.1-O2.n, O3.1-O3.n of the various implementations are calculated simultaneously and the combination of control parameters that minimizes the gain Gs is chosen after said control parameters have been calculated.

The transfer function thus parameterized may be used to automatically obtain a maximum increase without running the risk of denaturing the image, this for example advantageously enabling integration into a complete photographic image processing chain.

The invention claimed is:

1. A method, comprising:
increasing saturation of pixels of an image, each pixel having components defining a color, wherein said increase in saturation depends on a gain applied by a transfer function depending on the components of each pixel,
parameterizing the gain of the transfer function by at least one control parameter respectively dedicated to at least one type of reference image content, and
calculating a value of said at least one control parameter on the basis of actual content of said image by: determining colorimetric statistics of the pixels of said image from the components of the pixels, the colorimetric statistics of the pixels of the image including hue, brightness, and saturation of the color of each pixel, and processing said colorimetric statistics in accordance with at least one processing model respectively dedicated to preservation of said at least one type of reference image content,
wherein the parameterizing of the gain depends on at least one of the hue, the brightness, and the saturation of the color of each pixel.

2. The method according to claim 1, wherein the gain of the transfer function is parameterized by a plurality of control parameters, further comprising calculating values of said control parameters simultaneously, the control parameters parameterizing the gain of said transfer function being selected after said values of the control parameters have been calculated.

3. The method according to claim 2, further comprising selecting the control parameters that minimize the gain of said transfer function.

4. The method according to claim 1, wherein determining colorimetric statistics comprises:
converting the components of the pixels of the image to a hue-saturation-brightness colorimetric domain,
selecting pixels having brightnesses located in a range excluding extreme brightnesses,
classifying the selected pixels by hue segment, and
generating a histogram of the saturations of the selected pixels per hue segment.

5. The method according to claim 4, wherein said hue segments correspond to a pre-calibrated segmentation equally distributed between six main hues or a segmentation that is nonuniform and representative of the hues of image contents that are usual in photography.

6. The method according to claim 4, wherein said colorimetric statistics are processed in accordance with a first processing model comprising detecting a non-blue hue segment having a highest population of low-saturation pixels, said non-blue hue segment forming a first control parameter parameterizing at a value comprised between 0.9 and 1.1 the gain of said transfer function for the pixels corresponding to said non-blue hue segment.

7. The method according to claim 4, wherein said colorimetric statistics are processed in accordance with a second processing model comprising, on the basis of pre-established acceptable degrees of clipping of the saturation per hue segment and on the basis of a width of a distribution of the saturation per hue, calculating one gain value per hue segment ensuring said degrees of acceptable clipping are respected, said gain values forming second control parameters parameterizing the gain of said transfer function so that it is below said gain values per hue segment ensuring said degrees of acceptable clipping are respected.

8. The method according to claim 4, wherein said colorimetric statistics are processed in accordance with a third processing model comprising a calculation of an average saturation of the pixels per hue segment that, by way of a pre-established table of values, determines a ceiling value of the gain per hue segment, forming third control parameters parameterizing the gain of said transfer function so that it is below said ceiling values.

9. The method according to claim 1, wherein determining colorimetric statistics comprises:
detecting faces in the image and extracting a region of interest of the image corresponding to at least one face,
converting components of the pixels in the region of interest to a hue-saturation-brightness colorimetric domain, and
generating a histogram of the hues, a histogram of the brightnesses and a histogram of the saturations of the pixels in the region of interest, and
wherein said colorimetric statistics are processed in accordance with a fourth processing model comprising:
establishing a range of hues of skin colors in the image by selecting classes of the histogram of hues that are centered on a median and above a threshold population,
establishing an upper limit of a range of brightnesses of the skin colors in the image by selecting the median of the histogram of brightnesses, and
establishing a ceiling value of the gain, said range of hues, range of brightnesses and ceiling value forming fourth control parameters parameterizing the gain of the transfer function so that it is below said ceiling value for the colors comprised in said ranges of hues and/or brightnesses.

10. The method according to claim 9, wherein establishing the ceiling value of the gain includes selecting the median of the histogram of those saturations of the pixels in the region of interest which are included in a pre-established interval.

11. The method according to claim 9, wherein generating the histogram of the hues of the pixels in the region of interest comprises smoothing a number of occurrences of hues using a moving window of 3 or 5 hue span.

12. The method according to claim 9, wherein the fourth control parameters parameterize the gain of said transfer function so that it is below said ceiling value for colors comprised in said range of hues in the case where an average brightness of the region of interest is above a threshold, and for colors comprised in said range of brightnesses in the case where the average brightness of the region of interest is below said threshold.

13. The method according to claim 1, wherein the colorimetric statistics are only determined for pixels belonging to an identified region of interest.

14. A device for processing an image formed from pixels each having components defining a color, comprising:
a processing circuit configured to implement an increase in a saturation of the pixels of the image depending on a gain applied by a transfer function that is dependent on components of each pixel,
a parameterizing circuit configured to parameterize the gain of said transfer function with at least one control parameter respectively dedicated to at least one type of reference image content, and a calculating circuit configured to calculate a value of said at least one control parameter on the basis of actual content of said image by implementing calculations including:

determining colorimetric statistics of the pixels of said image, the colorimetric statistics of the pixels of the image including hue, brightness, and saturation of the color of each pixel; and processing said colorimetric statistics in accordance with at least one processing model respectively dedicated to preservation of said at least one type of reference image content;

wherein the parameterizing circuit parameterizes the gain dependent upon at least one of the hue, the brightness, and the saturation of the color of each pixel.

15. The device according to claim 14, wherein the parameterizing circuit is configured to parameterize at least one ceiling of the gain of the transfer function depending on one or more of the hue, the brightness and the saturation of the color of each pixel.

16. The device according to claim 14, wherein the calculating circuit is configured to simultaneously calculate values of a plurality of control parameters, and wherein the parameterizing circuit is configured to select the control parameters parameterizing the gain of said transfer function after said control parameters have been calculated.

17. The device according to claim 16, wherein said parameterizing circuit is configured for selecting control parameters that minimize the gain of said transfer function.

18. The device according to claim 14, wherein the calculating circuit is configured to determine colorimetric statistics by:

conversion of the components of the pixels of the image to a hue-saturation-brightness colorimetric domain, selection of the pixels having brightnesses located in a range excluding extreme brightnesses, classification of the selected pixels by hue segment, and generation of a histogram of the saturations of the selected pixels per hue segment.

19. The device according to claim 18, wherein the hue segments correspond to one of:

a pre-calibrated segmentation equally distributed between six main hues, and a segmentation that is nonuniform and representative of the hues of image contents that are usual in photography.

20. The device according to claim 18, wherein the calculating circuit is configured to implement said processing of the colorimetric statistics in accordance with a first processing model comprising detecting a non-blue hue segment having a highest population of low-saturation pixels, said hue segment forming a first control parameter, the parameterizing circuit further configured, on the basis of the first control parameter, to parameterize at a value comprised between 0.9 and 1.1 the gain of said transfer function for the pixels corresponding to said non-blue hue segment.

21. The device according to claim 18, wherein the calculating circuit is configured to implement said processing of the colorimetric statistics in accordance with a second processing model comprising calculating, on the basis of pre-established acceptable degrees of clipping of the saturation per hue segment and on the basis of a width of a distribution of a distribution of the saturation per hue, a gain value ensuring said acceptable degrees of clipping are respected, said gain values forming second control parameters, and wherein the parameterizing circuit is configured, on the basis of the second control parameters, to parameterize the gain of said transfer function so that it is below said gain values per hue segment ensuring said degrees of acceptable clipping are respected.

22. The device according to claim 18, wherein the calculating circuit is configured to implement said processing of the colorimetric statistics in accordance with a third processing model comprising calculating an average saturation of the pixels per hue segment and, by way of a table of data, determining ceiling values of the gain of said transfer function per hue segment forming third control parameters, and wherein the parameterizing circuit is configured, on the basis of the third control parameters, to parameterize the gain of said transfer function so that it is below said ceiling values.

23. The device according to claim 14, wherein the calculating circuit is configured to implement a determination of colorimetric statistics that comprises detecting faces in the image and extracting a region of interest of the image corresponding to at least one face, converting the components of the pixels in the region of interest to a hue-saturation-brightness colorimetric domain, generating a histogram of the hues, a histogram of the brightnesses and a histogram of the saturations of the pixels in the region of interest, wherein the calculating circuit is further configured to implement said processing of colorimetric statistics in accordance with a fourth processing model comprising establishing a range of hues of skin colors in the image by selecting classes of the histogram of hues that are centered on a median and above a threshold population, establishing an upper limit of a range of brightnesses of the skin colors in the image by selecting the median of the histogram of brightnesses and establishing a ceiling value of the gain of said transfer function, said range of hues, range of brightnesses and ceiling value forming fourth control parameters, and wherein the parameterizing circuit is configured, on the basis of the fourth control parameters, to parameterize the gain of the transfer function so that it is below said ceiling value for the colors comprised in said ranges of hues and/or brightnesses.

24. The device according to claim 23, wherein the calculating circuit establishes the ceiling value of the gain of said transfer function by selecting the median of the histogram of those saturations of the pixels in the region of interest which are included in a pre-established interval.

25. The device according to claim 23, wherein the calculating circuit generates the histogram of the hues of the pixels in the region of interest by smoothing a number of occurrences of hues using a moving window, of 3 or 5 hue span.

26. The device according to claim 23, wherein the parameterizing circuit is configured, on the basis of the fourth control parameters, to parameterize the gain of said transfer function so that it is below said ceiling value for colors comprised in said range of hues in the case where an average brightness of the region of interest is above a threshold, and to parameterize the gain of said transfer function so that it is below said ceiling value for colors comprised in said range of brightnesses in the case where the average brightness of the region of interest is below said threshold.

27. The device according to claim 14, wherein the calculating circuit, the parameterizing circuit and the processing circuit are configured to be implemented automatically.

28. The device according to claim 14, implemented in an electronic apparatus comprising one of a personal computer, a tablet and a mobile telephone.

29. The device according to claim 14, wherein the calculating circuit only determines the colorimetric statistics for pixels belonging to an identified region of interest.

* * * * *